(12) United States Patent
Morgott et al.

(10) Patent No.: US 9,964,679 B2
(45) Date of Patent: May 8, 2018

(54) HOLOGRAPHIC FOIL AND METHOD FOR PRODUCING SAME

(71) Applicant: OSRAM Opto Semiconductors GmbH, Regensburg (DE)

(72) Inventors: Stefan Morgott, Pentling (DE); Joachim Reill, Zeitlarn (DE); Peter Brick, Regensburg (DE)

(73) Assignee: OSRAM OPTO SEMICONDUCTOR GMBH, Regensburg (DE)

( * ) Notice: Subject to any disclaimer, the term of this patent is extended or adjusted under 35 U.S.C. 154(b) by 48 days.

(21) Appl. No.: 14/783,833

(22) PCT Filed: Apr. 3, 2014

(86) PCT No.: PCT/EP2014/056735
§ 371 (c)(1),
(2) Date: Oct. 9, 2015

(87) PCT Pub. No.: WO2014/166816
PCT Pub. Date: Oct. 16, 2014

(65) Prior Publication Data
US 2016/0306089 A1    Oct. 20, 2016

(30) Foreign Application Priority Data

Apr. 9, 2013  (DE) .................. 10 2013 103 539

(51) Int. Cl.
*G02B 5/32* (2006.01)
*F21V 5/00* (2018.01)
(Continued)

(52) U.S. Cl.
CPC ............... *G02B 5/32* (2013.01); *F21V 5/003* (2013.01); *G02B 5/0252* (2013.01);
(Continued)

(58) Field of Classification Search
CPC ........... G02B 5/32; G02B 5/0252; G03H 1/26
(Continued)

(56) References Cited

U.S. PATENT DOCUMENTS 4,687,282 A    8/1987   Ferrante
5,519,516 A *  5/1996   Wreede .................... G03H 1/02
                                                    359/13
(Continued)

FOREIGN PATENT DOCUMENTS

DE    102011079127 A1    1/2013
JP    2007237576 A       9/2007
WO    2011031802 A2      3/2011

OTHER PUBLICATIONS

Tedesco, J. M., et al., "5.3: Holographic Diffusers for LCD Backlights and Projection Screens", SID 93 Digest of Technical Papers, XP000867141, 1993, vol. 24, No. Part 01, pp. 29-32.

*Primary Examiner* — Audrey Y Chang
(74) *Attorney, Agent, or Firm* — McDermott Will & Emery LLP (57) ABSTRACT

Described is a holographic film (100) whose transmission and/or reflection properties vary periodically along at least one of its directions of principal extent, said film being designed for at least partial transmission (22, 28) of light (20, 26) of at least one first wavelength range that is irradiated from a multiplicity of periodically disposed illuminants (200) and that impinges on the holographic film (100). Also described are a lighting means (300), a backlighting means and a method for producing a holographic film (100).

14 Claims, 4 Drawing Sheets

US 9,964,679 B2
Page 2

(51) Int. Cl.
*G02B 5/02* (2006.01)
*G02B 5/18* (2006.01)
*G02B 27/30* (2006.01)
*G02F 1/1335* (2006.01)
*G03H 1/04* (2006.01)
*G03H 1/26* (2006.01)
*G03H 1/30* (2006.01)
*G03H 1/22* (2006.01)
*F21Y 105/10* (2016.01)
*F21Y 115/10* (2016.01)
*F21Y 113/13* (2016.01)

(52) U.S. Cl.
CPC ......... G02B 5/0263 (2013.01); G02B 5/0284 (2013.01); G02B 5/1861 (2013.01); G02B 5/1866 (2013.01); G02B 27/30 (2013.01); G02F 1/133606 (2013.01); G03H 1/0402 (2013.01); *F21Y 2105/10* (2016.08); *F21Y 2113/13* (2016.08); *F21Y 2115/10* (2016.08); *G02F 1/133603* (2013.01); *G02F 2001/133607* (2013.01); *G03H 2001/0415* (2013.01); *G03H 2001/0419* (2013.01); *G03H 2001/0439* (2013.01); *G03H 2001/0473* (2013.01); *G03H 2001/2228* (2013.01); *G03H 2001/264* (2013.01); *G03H 2001/306* (2013.01); *G03H 2222/34* (2013.01); *G03H 2222/52* (2013.01); *G03H 2223/23* (2013.01); *G03H 2270/23* (2013.01)

(58) Field of Classification Search
USPC .............. 359/15, 20, 22, 569, 13, 1; 283/86
See application file for complete search history.

(56) References Cited

U.S. PATENT DOCUMENTS

| | | | | |
|---|---|---|---|---|
| 5,659,420 | A * | 8/1997 | Wakai | G01B 11/026 356/511 |
| 6,449,235 | B1 * | 9/2002 | Kim | G11B 7/1275 369/112.01 |
| 7,301,683 | B2 * | 11/2007 | Tanaka | G03H 1/08 359/22 |
| 2001/0046071 | A1 | 11/2001 | Ichikawa et al. | |
| 2006/0077542 | A1 | 4/2006 | Tanaka | |
| 2007/0047254 | A1 | 3/2007 | Schardt et al. | |
| 2007/0053032 | A1 | 3/2007 | Popovich | |
| 2007/0195391 | A1 * | 8/2007 | Nishikawa | G02B 5/0252 359/15 |
| 2007/0223073 | A1 * | 9/2007 | Someno | G11B 7/123 359/15 |
| 2010/0039808 | A1 | 2/2010 | Purchase et al. | |
| 2011/0085421 | A1 | 4/2011 | Purchase et al. | |

* cited by examiner

HOLOGRAPHIC FOIL AND METHOD FOR PRODUCING SAME

A holographic foil and a method for producing same are described.

This patent application claims the priority of German patent application 102013103539.6, the disclosure content of which is hereby incorporated by reference.

Back-lighting devices having light sources distributed in a planar manner (Direct Backlights) frequently have a low light density in the regions between the light sources. This results in the background illumination not being sufficiently homogeneous. This uneven illumination results in undesired artefacts (clouding) when used for back-lighting display devices.

It is known from the prior art to provide the individual light sources, e.g., light-emitting diodes, with secondary optics, e.g., Argus lenses, in order to achieve an emission which is as wide as possible and to fill-in gaps in brightness between the light sources.

Furthermore, holographic methods are known from the prior art. The amplitude and phase information of the signal wave emanating from an object is hereby detected. More precisely, the signal wave is superimposed with a reference wave coherent therewith and the resulting interference pattern is recorded in a photo-sensitive layer. A reproduction of the original signal wave can be produced using the hologram produced in this manner by illuminating with the original reference wave.

So-called amplitude holograms are disadvantageous in that they absorb a considerable proportion of the incident light and therefore only have a low diffraction efficiency. In contrast, so-called phase holograms have a refraction-index modulation of the material and have a considerably higher diffraction efficiency.

Furthermore, volume holograms are used when the layer thickness is sufficiently large, in particular in relation to the interference structures impressed in the hologram. In volume holograms, modern techniques allow a plurality of independent holograms to be impressed (so-called multiplexing).

Moreover, reflection holograms are differentiated from transmission holograms. If, during light exposure, the signal wave and reference wave come from the same half-space, then a transmission hologram is produced in which, during the reconstruction, the reference wave is transmitted by the hologram and is thereby diffracted. In contrast, in reflection holograms, during light exposure, the signal wave and reference wave come from different half-spaces. In the reconstruction, the reference wave is reflected by the hologram.

A problem to be solved resides in the provision of a holographic foil which is able to transmit light with a light density which is as homogeneous as possible. A further problem to be solved resides in the provision of a holographic foil which is able to transmit light, emitted by a multiplicity of periodically arranged lighting means, with a light density which is as homogeneous as possible. A further problem to be solved resides in the provision of a holographic foil which is able to transmit light with different wavelengths with a light density which is as homogeneous as possible. A further problem to be solved resides in the provision of a back-lighting device which is able to back-light an element to be back-lit, e.g., an LCD display, as homogeneously as possible.

These problems are solved by a holographic foil according to claim 1, an illumination device according to claim 9, a back-lighting device according to claim 14 and a method for producing a holographic foil according to claim 15.

The transmission and/or reflection properties of the holographic foil vary periodically in at least one of their main extension directions. The main extension directions refer to those directions which lie within the plane of the foil.

The holographic foil is designed to at least partially transmit light from at least one first wavelength range, which light is emitted by a multiplicity of lighting means periodically arranged and impinges on the holographic foil. In particular, the holographic foil can be designed to at least partially transmit light from at least one first wavelength range, which light is emitted by a multiplicity of lighting means periodically arranged and impinges on the holographic foil, in the direction of an element to be illuminated or back-lit, that is to say to direct the light in the direction of an element to be illuminated or back-lit.

The first wavelength range is typically centred around a first wavelength which is used when exposing the holographic foil to light during the production of the holographic foil. The first wavelength can correspond for example to red light.

According to at least one embodiment of the holographic foil, provision is made that the transmission and/or reflection properties of the holographic foil vary with the same period which is provided for the periodic arrangement of the lighting means. As a result, a more homogeneous light density can be achieved in that the holographic foil partially reflects the impinging light in regions with above-average radiated light density and transmits the impinging light as completely as possible in regions with below-average radiated light density.

According to at least one embodiment of the holographic foil, provision is made that the holographic foil has a first multiplicity of periodically arranged regions which are formed as reflection holograms. This means that the holographic foil in these regions is designed for reflecting light from the first wavelength range emitted by the lighting means, i.e. to direct light into a half-space which faces the lighting means as seen from the holographic foil. As a result, it is achieved that the impinging light is partially reflected in these regions. In particular, the holographic foil can be designed to reflect light impinging on the holographic foil in the regions of the reflection holograms in the direction away from an element to be illuminated or back-lit, that is to say to direct the light away from an element to be illuminated or back-lit.

According to at least one embodiment of the holographic foil, provision is made that the reflection holograms are arranged at regular intervals in at least one main extension direction of the holographic foil. Preferably, the reflection holograms are each arranged in the regions which lie closest to the locations provided for the lighting means. The reflection holograms thus lie in the main emission direction directly behind the locations provided for the lighting means. The main emission direction is understood to mean here and hereinafter a direction which is perpendicular to the holographic foil and extends from the locations provided for the lighting means to the holographic foil.

According to at least one embodiment of the holographic foil, provision is made that the reflection holograms are designed to partially diffusely reflect the light emitted by the lighting means.

According to at least one embodiment of the holographic foil, provision is made that the holographic foil further has a second multiplicity of periodically arranged regions which are formed as transmission holograms. This means that the holographic foil in these regions is designed for transmitting light from the first wavelength range emitted by the lighting means, i.e. to direct light into a half-space which faces away from the lighting means as seen from the holographic foil. As a result, it is achieved that the impinging light is transmitted in these regions as completely as possible. In particular, the holographic foil can be designed to transmit light impinging on the holographic foil in the regions of the transmission holograms in the direction of an element to be illuminated or back-lit, that is to say to direct the light in the direction of an element to be illuminated or back-lit.

Preferably, the transmission holograms are each designed in a ring-shaped manner, wherein the centre points of the rings are arranged at regular intervals in at least one main extension direction of the holographic foil. Furthermore, it is particularly preferable that the centre points of the rings are arranged directly after the locations provided for the lighting means in the main emission direction. If the holographic foil also comprises reflection holograms, then it is particularly preferable that the transmission holograms are arranged in a ring-shaped manner around the reflection holograms. A ring-shaped arrangement is understood to mean both a circular arrangement and also an arrangement having a more general annular shape, e.g. in rectangles or squares, the reflection holograms being arranged around the centre points thereof. The transmission holograms are preferably arranged in regions in which light with a below-average light density impinges upon the holographic foil.

The multiplicity of transmission holograms can form a continuous surface or a continuous region. In contrast, the reflection holograms can be spaced apart from each other.

According to at least one embodiment of the holographic foil, provision is made that the transmission holograms are designed to collimate light emitted by the lighting means and transmitted by the transmission holograms, in a main emission direction. It is understood thereby that light transmitted by the transmission holograms is deflected in such a manner that as a whole the light transmitted by the holographic foil is emitted in a narrower solid angular range. In particular, it is preferable that light transmitted by the transmission holograms is deflected perpendicularly, and it is particularly preferable that light transmitted by the transmission holograms is deflected substantially in the main emission direction.

Emission in a particular emission direction is understood here and hereinafter to mean in each case an emission in a limited solid angular range, wherein the solid angular range is preferably defined by directions which each form an angle of less than 20°, preferably less than 10°, with the emission direction. The solid angle enclosed by the solid angular range is preferably less than 0.379 steradians, further preferably less than 0.0955 steradians.

A full width at half maximum of the first wavelength range and also the size of the solid angular ranges are dependent upon the precise design of the holographic foil and in particular upon the thickness thereof. Preferably, the reflection holograms and transmission holograms are formed as phase volume holograms. As the thickness of the foil increases, generally the full width at half maximum of the first wavelength range and the size of the solid angular ranges decreases since high requirements are increasingly placed on the fulfoilent of the Bragg condition.

According to at least one embodiment of the holographic foil, provision is made that the first wavelength range has a full width at half maximum of less than 30 nm.

The regular intervals between the reflection holograms and/or between the centre points of the transmission holograms, arranged in a ring-shape, are preferably between 5 cm and 40 cm, particularly preferably between 10 cm and 20 cm.

According to at least one embodiment of the holographic foil, provision is made that the holographic foil is further designed to at least partially transmit light from at least one second wavelength range emitted by a second multiplicity of periodically arranged lighting means and impinging upon the holographic foil, and to at least partially transmit light from at least one third wavelength range emitted by a third multiplicity of periodically arranged lighting means and impinging upon the holographic foil.

The holographic foil is preferably designed to direct light from the first, second and third wavelength ranges emitted by the lighting means and impinging upon the holographic foil in each case in substantially the same directions. It is understood thereby that the holographic foil transmits, reflects and/or collimates impinging light from the second and third wavelength ranges in each case similarly to the way this takes place with light from the first wavelength range.

In particular, the holographic foil can comprise
a multiplicity of periodically arranged regions which are formed as reflection holograms and are suitable to reflect light from the first wavelength range emitted by the lighting means,
a further multiplicity of periodically arranged regions which are formed as reflection holograms and are suitable to reflect light from the second wavelength range emitted by the lighting means, and
a further multiplicity of periodically arranged regions which are formed as reflection holograms and are suitable to reflect light from the third wavelength range emitted by the lighting means.

Alternatively or in addition, the holographic foil can comprise
a multiplicity of periodically arranged regions which are formed as transmission holograms and are suitable to transmit light from the first wavelength range emitted by the lighting means,
a further multiplicity of periodically arranged regions which are formed as transmission holograms and are suitable to transmit light from the second wavelength range emitted by the lighting means, and
a further multiplicity of periodically arranged regions which are formed as transmission holograms and are suitable to transmit light from the third wavelength range emitted by the lighting means.

The first wavelength range is preferably centred around a first wavelength which corresponds to red light. The second wavelength range is preferably centred around a second wavelength which corresponds to green light. The third wavelength range is preferably centred around a third wavelength which corresponds to blue light.

The holographic foil can comprise multiplex holograms, with which holograms for the different wavelength ranges are impressed into one layer at the same time. Alternatively, it is possible to arrange several individual holographic individual layers one behind the other and, for example, to attach them to each other, e.g. to laminate one on another.

An illumination device is also described which comprises a holographic foil which can be designed as described above, and a first multiplicity of periodically arranged lighting means which are designed to emit light from the at least one first wavelength range. The periodic arrangement of the lighting means preferably corresponds to the periodic variation of the transmission and/or reflection properties of the holographic foil. The holographic foil is arranged downstream of the lighting means in the main emission direction. The light emitted by the illumination device exits from the side of the holographic foil facing away from the lighting means and preferably propagates in the main emission direction. Optionally, an element arranged downstream of the holographic foil in the main emission direction, e.g. a diffuser, can ensure that the light emitted by the illumination device propagates in all directions on the side of the holographic foil facing away from the lighting means.

The distance between the lighting means and the holographic foil is preferably between 0.5 cm and 10 cm, particularly preferably between 1 cm and 5 cm.

According to at least one embodiment of the illumination device, provision is made that the illumination device is formed as an LED (light-emitting diode) illumination device or as a laser illumination device. This means that the illumination device comprises at least one light-emitting diode or a laser, preferably a semiconductor laser, in order to generate light from the first wavelength range.

According to at least one embodiment of the illumination device, provision is made that the multiplicity of periodically arranged lighting means comprises a multiplicity of light-emitting diodes. The light-emitting diodes can be those which emit white light or those which emit monochromatic light.

According to at least one embodiment of the illumination device, provision is made that for each of the lighting means, the region of the holographic foil is formed as a reflection hologram in each case, which region is arranged downstream of the respective lighting means in the main emission direction, i.e. that region of the holographic foil which lies closest to the respective lighting means.

When viewed perpendicularly with respect to the foil, the reflection holograms thus preferably lie directly behind the lighting means. As a result, it is achieved that the holographic foil at least partially reflects the impinging light in the regions in which an above-average light density is radiated, whereby a more homogeneous light density distribution is achieved.

According to at least one embodiment of the illumination device, provision is made that the illumination device further comprises a diffuser which is designed to diffusely scatter the light transmitted by the holographic foil. As a result, it is achieved that the illumination device uniformly emits light in the entire half-space lying in the main emission direction.

According to at least one embodiments of the illumination device, provision is made that the illumination device further comprises a second multiplicity of periodically arranged lighting means which are designed to emit light from at least one second wavelength range, and a third multiplicity of periodically arranged lighting means which are designed to emit light from at least one third wavelength range. The holographic foil is designed to at least partially transmit light emitted by the second multiplicity of lighting means and impinging upon the holographic foil, and to at least partially transmit light emitted by the third multiplicity of lighting means and impinging upon the holographic foil. Preferably, the first wavelength range corresponds to red light, the second wavelength range corresponds to green light and the third wavelength range corresponds to blue light.

According to at least one embodiment of the illumination device, provision is made that each lighting means emits light from each of three wavelength ranges. For example, the lighting means can be light-emitting diodes which emit white light. Optionally, different lighting means which emit light from different wavelength ranges can be regularly offset. The holographic foil can be designed to substantially identically direct white light, emitted by the lighting means, in each of the three wavelength ranges. Optionally, the holographic foil can be designed to direct light, emitted from offset lighting means, from different wavelength ranges in the same directions despite the offset arrangement.

A back-lighting device is also described, which has an illumination device which can be designed as described above, and holding means for an element to be back-lit. The element to be back-lit can be, for example, an LCD display or a poster. The element to be back-lit can be fixedly connected to the back-lighting device, e.g. in the case of an LCD display, or the back-lighting device can be designed to accommodate elements to be back-lit alternately, e.g. posters.

A method for producing a holographic foil, designed as described above, is also described, which method comprises the following method steps: providing a layer consisting of a holographic material, e.g., of a photo-refractive material, which in a light-exposing process, possibly after suitable development, experiences a permanent and locally variable displacement of its refractive index; and exposing the layer to light with at least one (preferably substantially flat) reference wave from the first wavelength range in a reference direction and simultaneously with at least one first (preferably substantially flat) signal wave from the first wavelength range, wherein the signal wave is radiated in a first multiplicity of regions on the other side of the layer to the reference wave, and wherein the signal wave is radiated in a second multiplicity of regions on the same side of the layer as the reference wave. The first multiplicity of regions corresponds to the above-described first multiplicity of regions in which reflection holograms are formed, and the second multiplicity of regions corresponds to the above-described second multiplicity of regions in which transmission holograms are formed.

For example, the foil can contain a silver halide or a photopolymer as the holographic material.

The reference direction preferably coincides with the main emission direction of the light in a subsequent use of the produced holographic foil.

According to at least one embodiment of the method, provision is made that the layer is exposed to light using the first reference wave having the first wavelength and at the same time using a first signal wave having the first wavelength in a first signal direction and using a second signal wave having the first wavelength in a second signal direction.

The different embodiments described above of the holographic projection screen are achieved by virtue of the fact that the two last-described light-exposing steps (that is to say the use either of at least one first signal wave or the use of a first and a second signal wave of the same wavelength) are performed for different wavelengths (in particular at the same time or successively). In particular, at least one of the two light-exposing steps can be performed for two or three different wavelengths, whereby the embodiments described above of the holographic foil can be formed.

A common feature for all the embodiments of the production method is that by using suitable signal waves the emission characteristic of the holographic foil can be fixed in a targeted manner. For all the embodiments it is preferable that the reference wave(s) and also the signal wave(s) are substantially flat waves. Moreover, the signal wave(s) of a particular wavelength are coherent with the reference wave of the same wavelength. Finally, preferably all the reference waves extend in the reference direction.

According to at least one embodiment of the method, provision is made that the layer is exposed to light using a scanning method, whereby a scalable light-exposing method is provided in which the requirements for the stability of the laser system typically used for light exposure are reduced.

According to at least one embodiment of the method, provision is made that the holographic foil is exposed to light using a mode-coupled, diode-pumped solid-state laser which emits for example at least one of three wavelengths (for example 446 nm, 532 nm and 628 nm). However, a direct diode laser can also be used, for example.

For example, a widened laser beam can be used which serves as the reference wave and as the signal wave simultaneously. In this case, a reference beam is split by a beam splitter and the partial beams are used separately to generate a reference wave and at least one signal wave. These impinge upon the layer at the same time and interfere with each other at that location.

However, partial areas of the layer can also be exposed to light in a mutually independent manner, until the entire area is exposed to light. In this manner, the entire area is exposed to light in a piece-wise manner, whereby the light exposure power requirements are reduced.

Preferably, during light exposure, wavelengths are used which correspond to those of the subsequently used illumination device. For example, when using a laser, this can also be used as the source of light exposure. When using light-emitting diodes, it is preferable to use light-emitting diodes whose wavelength corresponds to those of the light exposure laser.

The invention will be explained in more detail hereinafter with the aid of several exemplified embodiments and with reference to the drawings, in which.

In the following exemplified embodiments and figures, like components or components acting in an identical manner may be provided with like reference numerals. In principle, the figures and the size ratios, in particular also the size ratios of individual sub-regions and elements with respect to each other, are not to be considered as being to scale. Rather, they are used to illustrate individual aspects of the invention. They may be illustrated excessively large or thick for improved understanding or for ease of illustration. The invention is also not limited to the exemplified embodiments by the description using said embodiments. Rather, the invention includes any new feature and any combination of features, including in particular any combination of features in the claims, even if these features or this combination is not itself explicitly indicated in the claims or exemplified embodiments.

Figure 1:
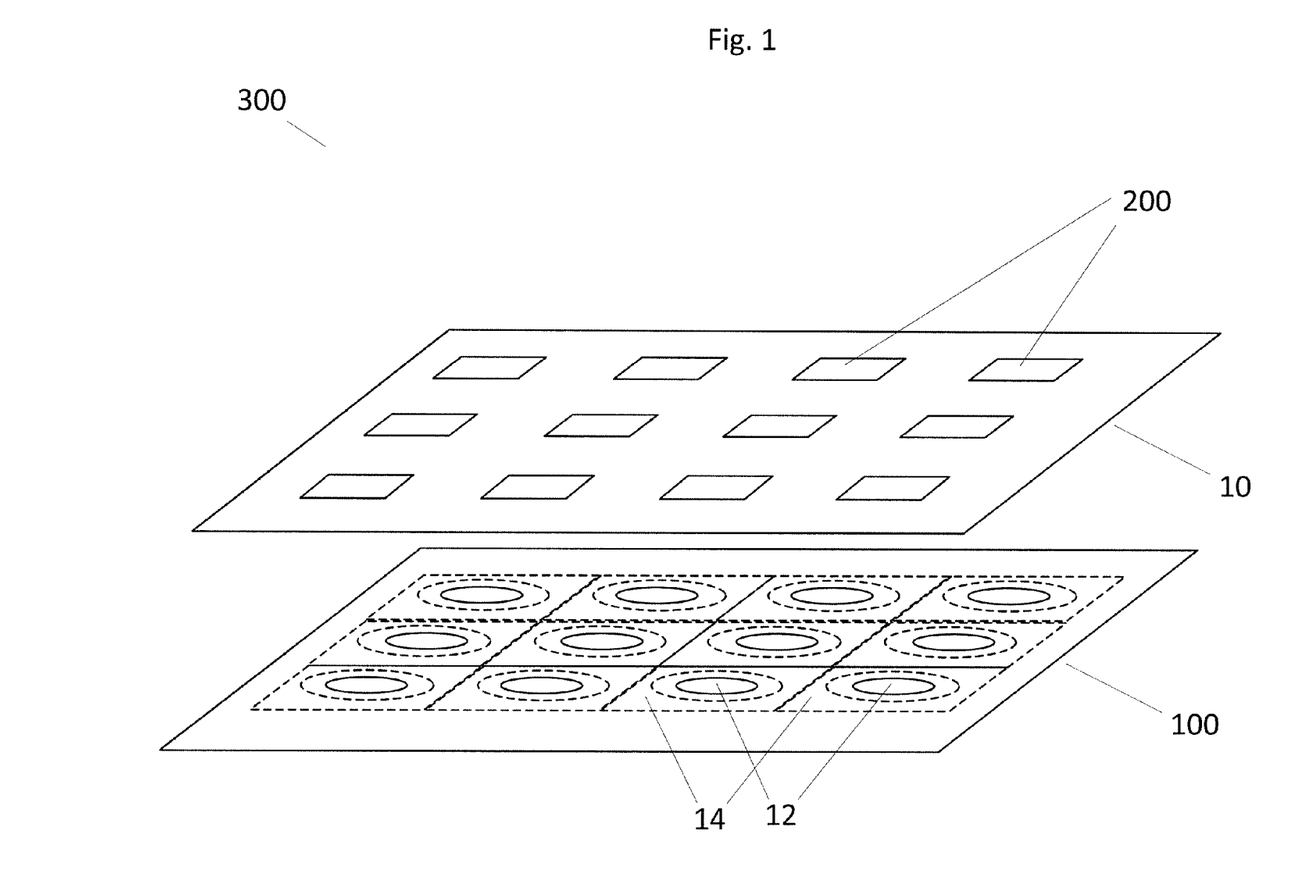
FIG. 1 shows a perspective view of a section of an illumination device according to a first exemplified embodiment.

FIG. 1 shows a perspective view of a section of an illumination device, designated as a whole with numeral 300, according to a first exemplified embodiment.

The illumination device 300 includes a holographic foil 100 and a multiplicity of light-emitting diodes 200 which are used as lighting means. The light-emitting diodes 200 are arranged on a support element 10 at regular intervals and form a regular two-dimensional grid. The holographic foil 100 is arranged opposite the light-emitting diodes 200 such that the light emitted by the light-emitting diodes 200 impinges upon the holographic foil 100.

Reflection holograms 12 are formed in the regions of the holographic foil 100 lying opposite the light-emitting diodes 200. Light emitted by the light-emitting diodes 200 and impinging upon the reflection holograms 12 is at least partially reflected. In this exemplified embodiment, the reflection holograms 12 are formed in a circular manner.

Furthermore, transmission holograms 14 are formed in regions of the holographic foil 100 which are particularly far removed from the light-emitting diodes 200. Light emitted by the light-emitting diodes and impinging upon the transmission holograms 14 is transmitted as completely as possible.

The borders of the transmission holograms 14 are shown in the drawing as dashed lines. In this exemplified embodiment, the transmission holograms 14 are formed in a ring-shaped manner around the reflection holograms 12. The inner edges of the transmission holograms 14 are circular in each case and the outer edges of the transmission holograms 14 are rectangular or square in each case. The transmission holograms 14 extend inwardly almost as far as the edges of the circular reflection holograms 12; on the outside the transmission holograms 14 each adjoin adjacent transmission holograms 14 which belong to adjacent light-emitting diodes 200.

Figure 2:
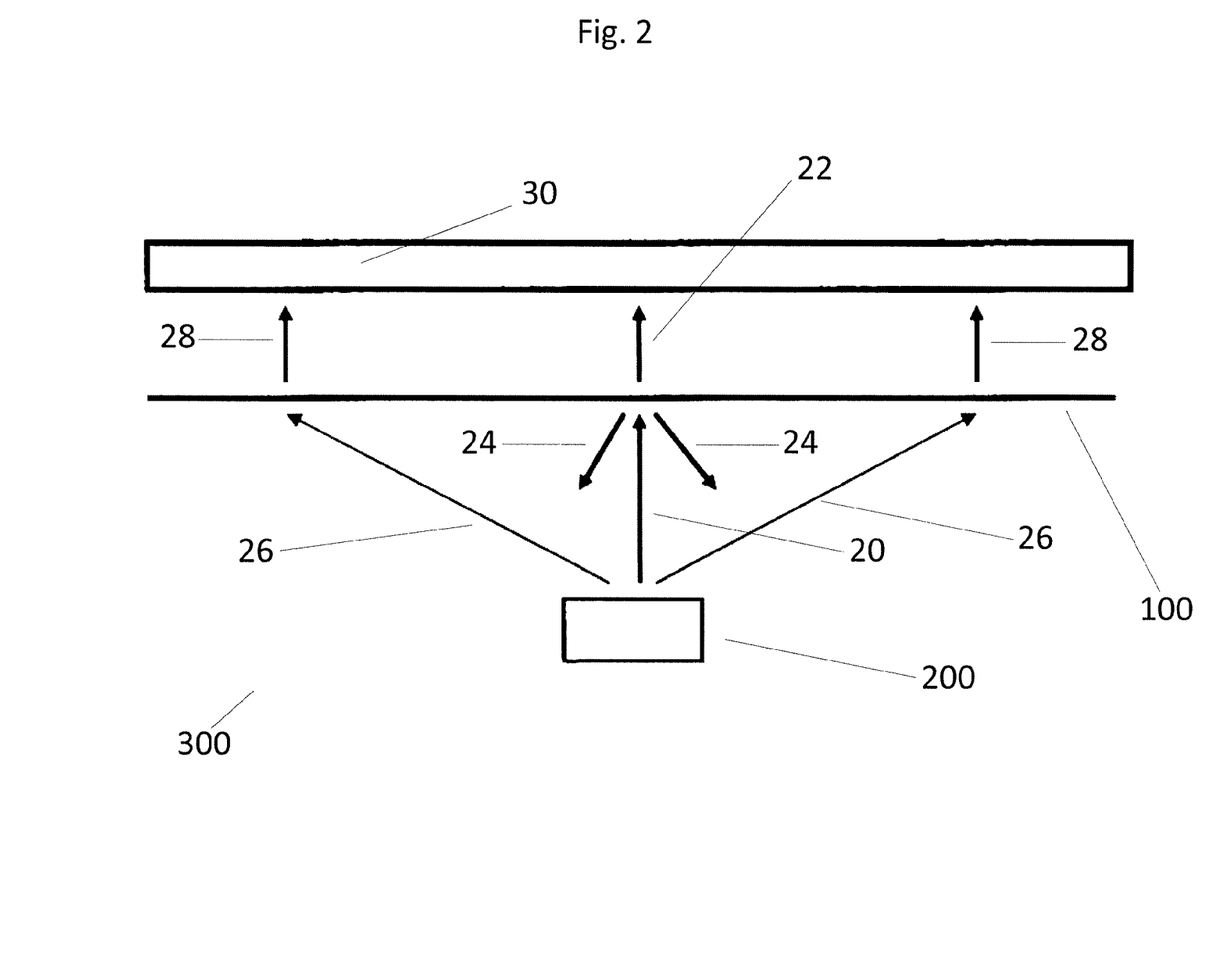
FIG. 2 shows a schematic sectional view of a section of the illumination device according to the first exemplified embodiment.

FIG. 2 shows a schematic sectional view of a section of the illumination device, designated as a whole by numeral 300, according to the first exemplified embodiment.

In FIG. 2, one of the light-emitting diodes 200 used as lighting means is shown by way of example with the regions of the holographic foil 100 lying opposite thereto. Light emitted by the light-emitting diode 200 impinges upon the holographic foil 100. The light-emitting diode 200 emits light in different directions; in particular the light-emitting diode 200 emits light in a main emission direction, which is perpendicular to the holographic foil 100, and also at an inclined angle to the main emission direction.

In the schematic figures, only discrete emission directions of the light diverted by the holographic foil 100 are shown. However, the light is emitted in each of the different exemplified embodiments in a solid angular range around the illustrated emission directions, as described in the general part. The illustration of the solid angular ranges was omitted for reasons of simplicity.

Light 20 emitted by the light-emitting diode 200 in the main emission direction impinges upon the holographic foil 100 perpendicularly. Since, in the case of an unchanged passage of the light 20 through the holographic foil 100, an above-average light density would occur, the holographic foil is designed such that only a part 22 of the light 20 emitted in the main emission direction is transmitted, whilst another part 24 of the light 20 emitted in the main emission direction is reflected. Preferably, the transmitted part 22 of the light 20 emitted in the main emission direction is thereby transmitted perpendicularly with respect to the holographic foil 100 without any deflection, and the reflected part 24 of the light 20 emitted in the main emission direction is preferably reflected diffusely in different directions.

Light 26 emitted by the light-emitting diode 200 at an inclined angle to the main emission direction impinges upon the holographic foil 100 at an inclined angle. Since, in the case of an unchanged passage of the light 26 through the holographic foil 100, a below-average light density would occur, the holographic foil 100 is designed such that it transmits light 26, impinging upon the holographic foil 100 at an inclined angle, as completely as possible. Preferably, the light 26 impinging upon the holographic foil 100 at an inclined angle is deflected perpendicularly, and, in a particularly preferred manner, the light 26 impinging upon the holographic foil 100 at an inclined angle is deflected in the main emission direction and is collimated thereby, so that the transmitted light 28 propagates on the side of the holographic foil 100 facing away from the light-emitting diodes 200 substantially in parallel with the light 22 preferably transmitted in the main emission direction.

In a preferred embodiment of the illumination device 300, an element 30 to be back-lit is arranged on the side of the holographic foil 100 facing away from the light-emitting diodes 200. The element 30 to be back-lit can be, for example, an LCD display or a poster.

In this case, the illumination device 300 is used as a back-lighting device for the element 30 to be back-lit and provides background illumination for the element 30 to be backlit, wherein the background illumination has a particularly homogeneous light density owing to the particular transmission and reflection properties of the holographic foil 100, whereby the element 30 to be back-lit is back-lit in a particularly homogeneous manner.

Furthermore, a diffuser (not shown) can be arranged on the side of the holographic foil 100 facing away from the light-emitting diodes 200. The light 22, 28 transmitted by the holographic foil 100 preferably in the main emission direction is diffusely transmitted by the diffuser so that the illumination device 300 can emit light in the entire half-space lying on the side of the diffuser facing away from the holographic foil. The illumination device 300 can thus be used as a planar light source, wherein the planer light source has a particularly homogeneous light density owing to the particular transmission and reflection properties of the holographic foil 100. If the illumination device 300 is used as a back-lighting device, then the diffuser is arranged between the holographic foil 100 and the element 30 to be back-lit. In this case, the diffuser effects further homogenisation of the background illumination of the back-lit element 30.

Figure 3:
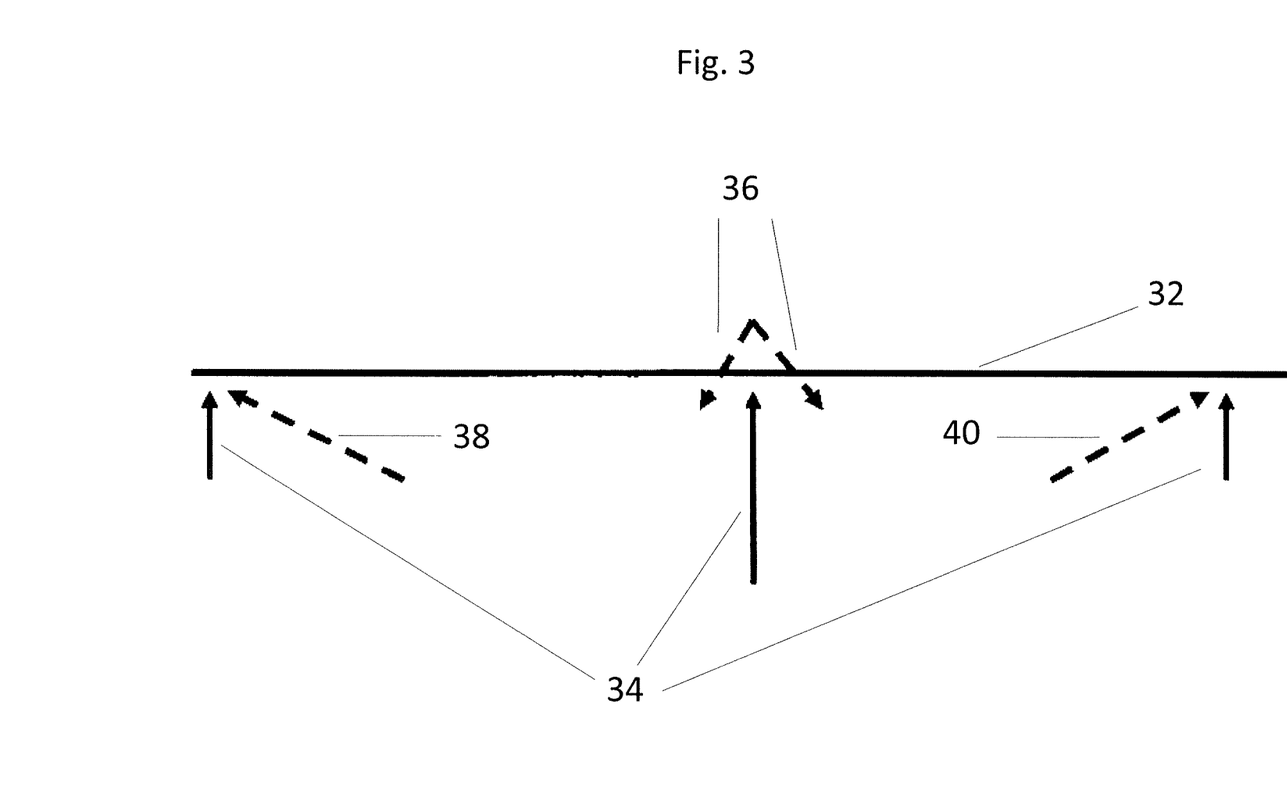
FIG. 3 shows a light exposure pattern for producing the holographic foil of the illumination device illustrated in FIG. 1.

FIG. 3 shows a light exposure pattern for producing the holographic foil 100 illustrated in FIG. 2.

In this case, a layer 32 consisting of a holographic material is exposed to light using a reference wave 34 which impinges upon the layer 32 preferably perpendicularly. The reference wave 34 thus impinges upon the layer 32 in the direction which is provided as the main emission direction of the holographic foil to be produced. At the same time, the layer 32 is exposed to light using a signal wave which is coherent with the reference wave 34 and in particular has the same wavelength as the reference wave 34. The reference wave 34 and the signal wave are preferably substantially flat waves.

Since different transmission and reflection properties are to be formed on the layer 32 in different regions, different regions must be exposed to light using signal waves having different properties. This can either occur at the same time, in that several signal waves are provided at the same time and are directed to different regions of the layer 32, or the different regions can be formed successively. In any case, the reference wave 34 and all the signal waves are preferably provided by splitting a single laser beam so that they are coherent with each other.

Reflection holograms are to be formed in the regions in which the holographic foil to be produced is to reflect a part of the impinging light. In these regions, the signal wave 36 is radiated on the other side of the layer 32 to the reference wave 34. The signal wave 36 is preferably diffuse in order to effect diffuse reflection of the holographic foil to be produced. However, in the case of a diffuse signal wave 36, this is also temporally coherent with the reference wave 34.

Transmission holograms are to be formed in the regions in which the holographic foil to be produced is to transmit, as completely as possible, and collimate the impinging light. In these regions, the signal wave 38, 40 is radiated on the same side of the layer 32 as the reference wave 34. The signal wave 38, 40 impinges upon the layer 32 preferably in each case from the direction which is provided as the incident direction of the light emitted by a lighting means. This can be effected in particular in that the signal wave 38, 40 is guided such that it passes through a location provided for a lighting means and is directed from there onto the layer 32. The signal wave 38, 40 can be expanded for example at the location provided for a lighting means, or the signal wave 38, 40 can be directed successively from the location provided for a lighting means to different regions in which transmission holograms are to be formed, wherein the reference wave 34 in this case is radiated to each of those regions at which a signal wave 38, 40 is directed at this point in time.

Figure 4:
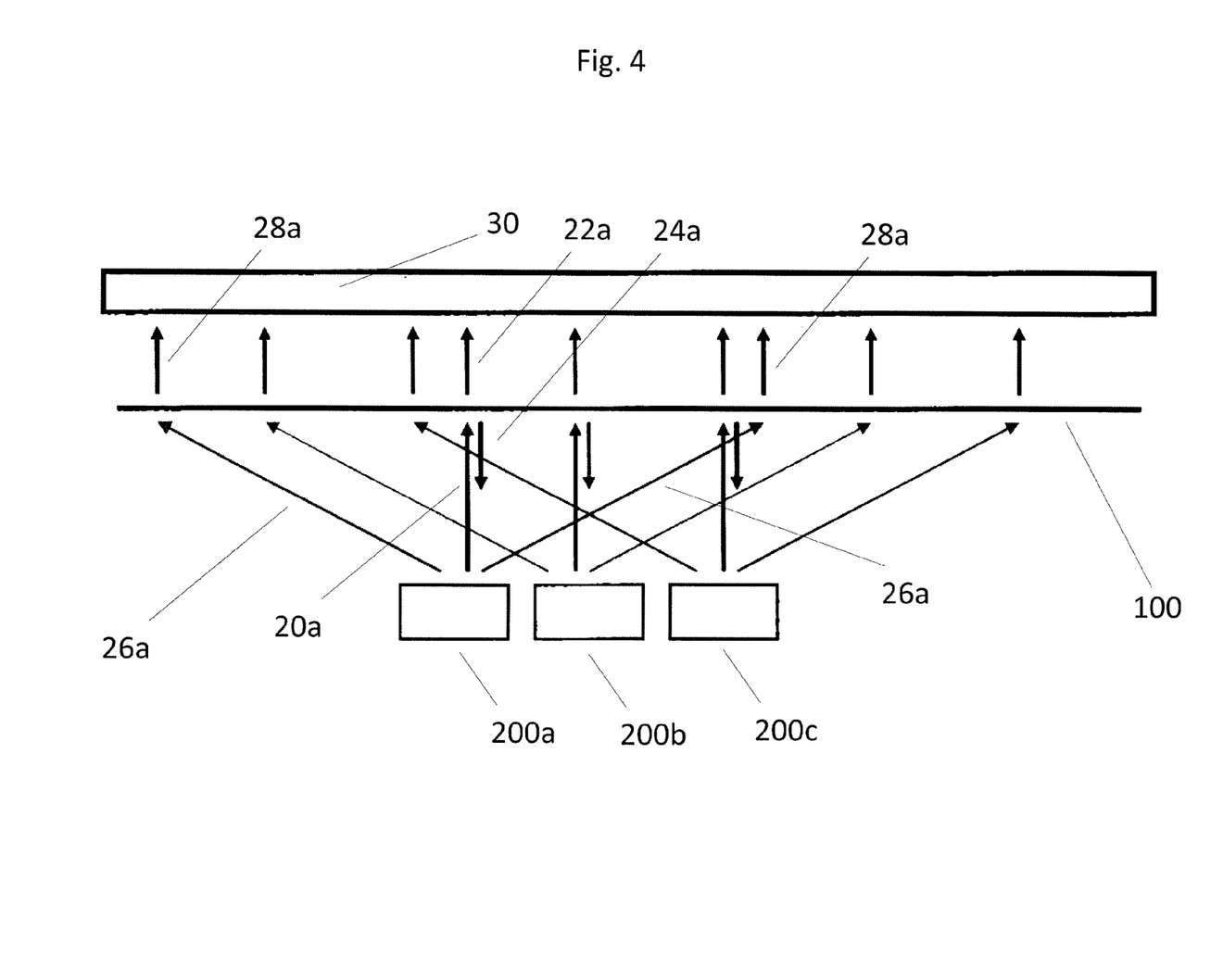
FIG. 4 shows a schematic sectional view of a section of an illumination device according to a second exemplified embodiment.

FIG. 4 shows a schematic sectional view of a section of an illumination device, designated as a whole by numeral 300, according to a second exemplified embodiment.

The illumination device illustrated in FIG. 4 likewise comprises a holographic foil 100 and light-emitting diodes which are used as lighting means. It differs from the illumination device illustrated in FIG. 2 in that light-emitting diodes 200*a*, 200*b*, 200*c* which emit light from three different wavelength ranges are provided. The description of FIG. 4 is primarily directed towards the resulting differences over the illumination device illustrated in FIG. 2.

The wavelength ranges can be in particular a wavelength range which corresponds to red light, a wavelength range which corresponds to green light and a wavelength range which corresponds to blue light.

A light-emitting diode is located in the illustrated section and emits light from one of the three wavelength ranges in each case. The light-emitting diode 200*a* emits light in a wavelength range which corresponds to red light, the light-emitting diode 200*b* emits light in a wavelength range which corresponds to green light, and the light-emitting diode 200*c* emits light in a wavelength range which corresponds to blue light.

In this case, the holographic foil 100 is designed to suitably deflect the impinging light from each of the light-emitting diodes 200*a*, 200*b*, 200*c* in each case. For each of the light-emitting diodes, the manner and direction of the deflection corresponds to the deflection described in relation to the illumination device illustrated in FIG. 2.

Light 20*a* emitted by the light-emitting diode 200*a* in the main emission direction impinges upon the holographic foil 100 perpendicularly. The holographic foil 100 is designed such that only a part 22*a* of the light 20*a* emitted in the main emission direction is transmitted, whilst another part 24*a* of the light 20*a* emitted in the main emission direction is reflected. Preferably, the transmitted part 22*a* of the light 20*a* emitted in the main emission direction is transmitted perpendicularly with respect to the holographic foil 100 without any deflection, and the reflected part 24*a* of the light 20*a* emitted in the main emission direction is preferably reflected diffusely in different directions. For the sake of a clear illustration, the reflection is shown only in a direction opposite the main emission direction; however, reflection occurs preferably diffusely in different directions as in the case of the illumination device illustrated in FIG. 2.

Light 26*a* emitted by the light-emitting diode 200*a* at an inclined angle to the main emission direction impinges upon the holographic foil 100 at an inclined angle. The holographic foil 100 is designed such that it transmits, as completely as possible, light 26*a* impinging upon the holographic foil 100 at an inclined angle. Preferably, the light 26*a* impinging upon the holographic foil 100 at an inclined angle is deflected perpendicularly, and, in a particularly preferred manner, the light 26*a* impinging upon the holographic foil 100 at an inclined angle is deflected in the main emission direction and is collimated thereby, so that the transmitted light 28*a* propagates on the side of the holographic foil 100 facing away from the light-emitting diodes substantially in parallel with the light 22*a* preferably transmitted in the main emission direction.

The light emitted by the light-emitting diodes 200*b* and 200*c* from the second and third wavelength range respectively is deflected in a corresponding manner and direction as illustrated in the drawing.

In order to produce a holographic foil for use in an illumination device illustrated in FIG. 4, the light exposure pattern illustrated in FIG. 3 can be applied consecutively using reference and signal waves of three different wavelengths, e.g. having a first wavelength which corresponds to red light, a second wavelength which corresponds to green light and a third wavelength which corresponds to blue light. Alternatively, the light exposure pattern can be applied simultaneously for the three wavelengths. Moreover, it is also possible to expose three different individual layers 32 to light using one of the three different wavelengths in each case as per the illustrated light exposure pattern and to subsequently fix them to one another.

The invention claimed is:

1. A holographic foil, whose transmission and/or reflection properties vary periodically in at least one of its main extension directions and which is designed to at least partially transmit light from at least one first wavelength range emitted by each of a multiplicity of periodically arranged lighting means and impinging upon the holographic foil, the holographic foil comprising:
   a first multiplicity of periodically arranged regions which are formed as reflection holograms, designed to reflect light of the first wavelength range, and
   a second multiplicity of periodically arranged regions which are formed as transmission holograms, designed to transmit light of the first wavelength range,
   wherein the transmission holograms are each formed in a ring-shaped manner around one of the reflection holograms, respectively.

2. The holographic foil according to claim 1, wherein the reflection holograms are arranged at regular intervals in at least one main extension direction of the holographic foil.

3. The holographic foil according to claim 2, wherein the regular intervals are between 5 cm and 40 cm.

4. The holographic foil according to claim 1, wherein the reflection holograms are designed to partially diffusely reflect light emitted by the lighting means.

5. The holographic foil according to claim 1, wherein the center points of the ring-shaped transmission holograms are arranged at regular intervals in at least one main extension direction of the holographic foil.

6. The holographic foil according to claim 1, wherein the transmission holograms are designed to collimate light, emitted by the lighting means and transmitted by the transmission holograms, in a main emission direction.

7. A method for producing a holographic foil according to claim 1, comprising the following method steps:
   providing a layer consisting of a holographic material; and
   exposing the layer to light using at least one reference wave from the first wavelength range in a reference direction and at the same time using at least one first signal wave from the first wavelength range,
   wherein the signal wave is radiated in a first multiplicity of regions on the other side of the layer to the reference wave, and
   wherein the signal wave is radiated in a second multiplicity of regions on the same side of the layer as the reference wave.

8. An illumination device, comprising:
   a first multiplicity of periodically arranged lighting means which are designed to emit light from at least one first wavelength range; and
   a holographic foil, whose transmission and reflection properties vary periodically in at least one of its main extension directions and which is designed to at least partially transmit light from the at least one first wavelength range emitted by each of the first multiplicity of periodically arranged lighting means and impinging upon the holographic foil,
   wherein the holographic foil comprises
      a first multiplicity of periodically arranged regions which are formed as reflection holograms, designed to reflect light of the at least one first wavelength range, and
      a second multiplicity of periodically arranged regions which are formed as transmission holograms, designed to transmit light of the first wavelength range, wherein the transmission holograms are each formed in a ring-shaped manner around one of the reflection holograms, respectively, and
   wherein at each of the lighting means, the region of the holographic foil is formed as a reflection hologram in each case, which region is arranged downstream of the respective lighting means in a viewing direction perpendicular to two main extension directions of the holographic foil such that the light of the at least one first wavelength range, which is transmitted through the holographic foil, has a homogeneous light density.

9. The illumination device according to claim 8, wherein the first multiplicity of periodically arranged lighting means includes a multiplicity of light-emitting diodes.

10. The illumination device according claim 8, further comprising a diffuser which is designed to diffusely scatter the light transmitted from the holographic foil.

11. The illumination device according to claim 8, further comprising:
   a third multiplicity of periodically arranged lighting means which are designed to emit light from at least one second wavelength range; and
   a fourth multiplicity of periodically arranged lighting means which are designed to emit light from at least one third wavelength range,
   wherein the holographic foil is further designed to at least partially transmit light emitted by each of the third multiplicity of lighting means and impinging upon the holographic foil, and wherein the holographic foil is further designed to at least partially transmit light emitted by each of the fourth multiplicity of lighting means and impinging upon the holographic foil.

12. A back-lighting device, comprising:
an illumination device according to claim 8; and
holding means for an element to be backlit.

13. A holographic foil, whose transmission and/or reflection properties vary periodically in at least one of its main extension directions and which is designed to at least partially transmit light from at least one first wavelength range emitted by each of a multiplicity of periodically arranged lighting means and impinging upon the holographic foil, the holographic foil comprising:
   a first multiplicity of periodically arranged regions which are formed as reflection holograms; and
   a second multiplicity of periodically arranged regions which are formed as transmission holograms,
   wherein the transmission holograms are each formed in a ring-shaped manner around one of the reflection holograms, respectively,
   wherein the transmission and reflection properties of the holographic foil vary with the same period which is provided for the periodic arrangement of the lighting means so that a homogeneous light density can be achieved.

14. The holographic foil according to claim 13, wherein the center points of the ring-shaped transmission holograms are arranged at regular intervals in at least one main extension direction of the holographic foil, and
   wherein the regular intervals are between 5 cm and 40 cm.

* * * * *

UNITED STATES PATENT AND TRADEMARK OFFICE
CERTIFICATE OF CORRECTION

PATENT NO. : 9,964,679 B2
APPLICATION NO. : 14/783833
DATED : May 8, 2018
INVENTOR(S) : Stefan Morgott et al.

It is certified that error appears in the above-identified patent and that said Letters Patent is hereby corrected as shown below:

On the Title Page

Item (73):
Replace "OSRAM OPTO SEMICONDUCTOR GMBH" with "OSRAM OPTO SEMICONDUCTORS GMBH"

In the Claims

Column 11, Line 40:
Replace "...transmission and/or..." with "....transmission and...."

Column 13, Line 8:
Replace "...transmission and/or..." with "....transmission and...."

Signed and Sealed this
Second Day of April, 2019

Andrei Iancu
*Director of the United States Patent and Trademark Office*